J. K. Millard,

Water Wheel,

N° 4,513.

Patented May 9, 1846.

UNITED STATES PATENT OFFICE.

J. K. MILLARD, OF TOWN HILL, PENNSYLVANIA.

IMPROVEMENT IN REGULATING AND DIRECTING WATER UPON WATER-WHEELS.

Specification forming part of Letters Patent No. 4,513, dated May 9, 1846.

*To all whom it may concern:*

Be it known that I, J. K. MILLARD, of Town Hill, in the county of Luzerne and State of Pennsylvania, have invented new and useful Improvements in the Manner of Applying Water to Water-Wheels; and I do hereby declare that the following is a full, clear, and exact description of the principle or character which distinguishes my invention from all other things before known and of the manner of making, constructing, and using the same, reference being had to the accompanying drawings, making part of this specification, in which—

Figure 3:
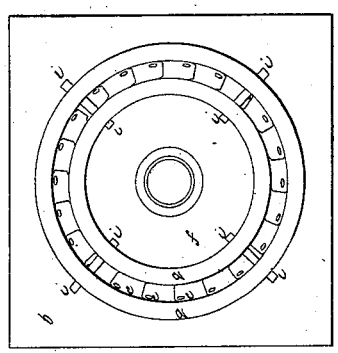
Figure 2:
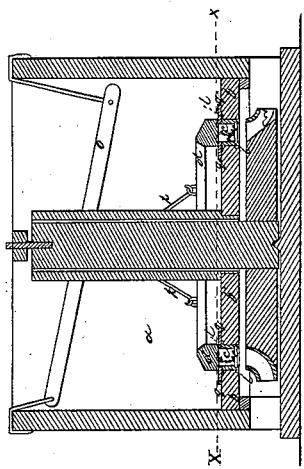
Figure 1:
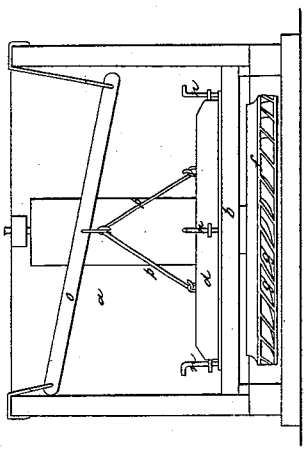

Figure 1 is an elevation of the wheel, &c., with one side of the flume removed to exhibit the arrangement; Fig. 2, a vertical section, and Fig. 3 a horizontal section taken at the line X X of Fig. 2.

The same letters indicate like parts in all the figures.

For the purpose of regulating the discharge of water onto the wheel, whether on the turbine, tub, or reacting principle, a gate has been heretofore employed, the moving of which regulates the quantity of water to be admitted; but this does not effect one of the important objects to be attained in discharging the water onto the buckets of a wheel, which is the giving to the water where it is conducted to the buckets a direction which shall cause it to strike the buckets in the most effective manner. This is the leading object of my improvement, which consists in the arrangement of a series of hinged shutters, the axes of which radiate from the axis of the wheel, and which when closed overlap each other, these being combined with and suspended each alike to an annular gate, so that by the lifting of this gate to admit the water to the shutters these are opened to the required extent and present a series of inclined planes or chutes to direct and discharge the water onto all the buckets of the wheel at the required angle to produce the greatest effect, the annular gate shutting off the water entirely from the shutters and protecting them when the wheel is not in action.

Figure 4:
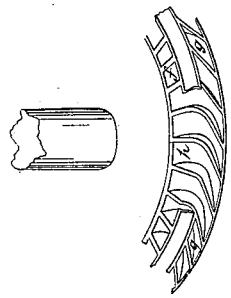

In the accompanying drawings, *a* represents the vertical flume; *b*, the horizontal partition above the wheel, in which is formed the annular aperture *c* for the admission of water, governed by the annular gate *d* and the series of shutters *e*, suspended thereto. The wheel *f* is horizontal, and the buckets *g* are formed in its rim, open at top to receive the water which is discharged at the periphery, they being gradually curved, (as represented in Fig. 4, which is a perspective view of a portion of the wheel with a portion of the rim removed from some of the buckets to show their form,) as represented at *h*, which shows the back of one bucket and the front of another. The front of the bucket, or that part against which the water first strikes, is curved forward, and then gradually curves back and from the axis of the wheel, so that the water, after acting by percussion in striking in this hollow near the top of the wheel, shall act by its gravity on the inclined surface, and then by reaction in leaving the bucket at the periphery of the wheel.

The annular aperture *c* in the horizontal partition *b* above the wheel corresponds with the circles formed by the buckets of the wheel, and the inner part *b'* of the partition *b* is connected with the outer portion by means of four or more metal plates *i*. The series of shutters *e* have their journals in pieces of metal *l*, that are let into the partition from above and are supported by their flanges, which are also let into the upper surface of the partition. The journaled ends of the shutters are nearly on a level with the bottom surface of the partition, and the other end of one laps over the journaled end of the next, and the overlapping or free end of each of these is suspended to the under face of the annular gate *d* by means of a link *m*, so that by the raising of the gate all the shutters are opened at once and to the same extent, the gate moving on guide-rods *n* and being operated by the levers *o o*, connected with it by means of four links *p*. The bed on which the gate closes to insure a tight joint is formed of two wooden rings *q q*, secured to the partition over the flanges of the pieces *l l* and over the plates *i* to hold them securely in place.

What I claim as my invention, and desire to secure by Letters Patent, is—

The arrangement of the series of shutters to regulate and direct the discharge of the water onto the buckets of the wheel, in combination with the gate to which they are suspended and by which they are operated and protected from the too violent action of the water, this gate at the same time affording a better means of shutting off the water than could be effected practically by the shutters, as herein described.

J. K. MILLARD.

Witnesses:
A. P. BROWNE,
J. J. GREENOUGH.